(12) United States Patent
Balk et al.

(10) Patent No.: US 12,371,266 B2
(45) Date of Patent: Jul. 29, 2025

(54) HELICAL CONVEYOR

(71) Applicant: AMBAFLEX INTERNATIONAL B.V., Zwaag (NL)

(72) Inventors: Wouter Balk, Baambrugge (NL); Emiel Martijn Schouten, Amsterdam (NL)

(73) Assignee: Ambaflex International B.V., Zwaag (NL)

( * ) Notice: Subject to any disclaimer, the term of this patent is extended or adjusted under 35 U.S.C. 154(b) by 3 days.

(21) Appl. No.: 18/556,615

(22) PCT Filed: Apr. 19, 2022

(86) PCT No.: PCT/EP2022/060214
§ 371 (c)(1),
(2) Date: Oct. 20, 2023

(87) PCT Pub. No.: WO2022/223501
PCT Pub. Date: Oct. 27, 2022

(65) Prior Publication Data
US 2024/0190660 A1    Jun. 13, 2024

(30) Foreign Application Priority Data

Apr. 23, 2021   (EP) .................................... 21170047

(51) Int. Cl.
*B65G 11/06* (2006.01)
*B65G 15/02* (2006.01)

(52) U.S. Cl.
CPC ............ *B65G 11/063* (2013.01); *B65G 15/02* (2013.01)

(58) Field of Classification Search
CPC .... B65G 11/063; B65G 15/02; B65G 17/086; B65G 21/18; B65G 2207/24; B65G 11/203
(Continued)

(56) References Cited

U.S. PATENT DOCUMENTS

| 782,009 | A | * | 2/1905 | Dodge | ................... | B65G 21/18 |
| 1,047,273 | A | * | 12/1912 | Morris | ................. | B65G 11/063 |
| | | | | | | 198/724 |

(Continued)

FOREIGN PATENT DOCUMENTS

| EP | 2429929 A1 | 3/2012 |
| JP | S5624708 U | 3/1981 |
| WO | 2010130716 A1 | 11/2010 |

OTHER PUBLICATIONS

International Search Report and Written Opinion in corresponding International Ser. No. PCT/EP2022/060214 dated Aug. 26, 2022.

*Primary Examiner* — Mark A Deuble
(74) *Attorney, Agent, or Firm* — Steven M. Koehler; Westman, Champlin & Koehler, P.A.

(57) ABSTRACT

A helical conveyor for transporting products in downward direction by means of gravity comprises a frame and a helical track extending around an upright centerline. The helical track is supported by the frame and comprises a bottom for bearing a product. The bottom has an inclination angle in a direction (X) along the helical track. At least a portion of the bottom is formed by a transport surface of a drivable conveying system such that the transport surface has a predefined speed in downward direction (X) along the helical track. The inclination angle at an inner bend of the transport surface of the conveying system is larger than 20°.

20 Claims, 2 Drawing Sheets

(58) Field of Classification Search
USPC .............................................. 198/778; 193/12
See application file for complete search history.

(56) References Cited

U.S. PATENT DOCUMENTS

| | | | | |
|---|---|---|---|---|
| 1,892,203 | A * | 12/1932 | Burton | A47C 27/05 |
| | | | | 5/717 |
| 2,708,995 | A | 5/1955 | Saliba | |
| 3,565,226 | A | 2/1971 | Winchester | |
| 4,196,804 | A * | 4/1980 | Hecketsweiler | B65G 21/18 |
| | | | | 198/813 |
| 4,269,302 | A * | 5/1981 | Garvey | B65G 21/18 |
| | | | | 198/607 |
| 4,627,529 | A * | 12/1986 | Tarlton | B65G 21/18 |
| | | | | 198/840 |
| 4,643,295 | A * | 2/1987 | Arnemann | B65G 21/18 |
| | | | | 198/594 |
| 6,244,424 | B1 | 6/2001 | Reusser et al. | |
| 7,641,034 | B2 * | 1/2010 | Boustani | B65G 11/063 |
| | | | | 193/12 |
| 8,100,254 | B2 * | 1/2012 | Balk | B65G 17/002 |
| | | | | 198/468.8 |
| 8,276,746 | B2 * | 10/2012 | Klotzki | B65G 11/063 |
| | | | | 198/778 |
| 11,046,523 | B2 * | 6/2021 | Steffen | B65G 17/066 |
| 2012/0103762 | A1 | 5/2012 | Balk | |

* cited by examiner

HELICAL CONVEYOR

CROSS-REFERENCE TO RELATED APPLICATION (S)

This Application is a Section 371 National Stage Application of International Application No. PCT/EP2022/060214, filed Apr. 19, 2022 and published as WO 2022/223501 A1 on Oct. 27, 2022, in English, and further claims priority to European patent application Ser. No. 21170047.1, filed Apr. 23, 2021.

BACKGROUND

The present invention relates to a helical conveyor for transporting products in downward direction by means of gravity, comprising a frame and a helical track extending around an upright centerline, which helical track is supported by the frame and comprises a bottom for bearing a product, wherein the bottom has an inclination angle in a direction along the helical track.

Such a helical conveyor is known from U.S. Pat. No. 3,565,226. The known helical conveyor is also called a spiral chute and is suitable for transferring products downwardly from an elevated height level by means of gravity. In other words, a product automatically slides or rolls on the bottom in downward direction along the helical track. A side wall at the outer bend of the bottom prevents products from unintentionally leaving the helical track in outward direction due to centrifugal forces. In practice, selection of the size of the inclination angle is compromised between preventing a product from getting stuck within the helical track due to a relatively small inclination angle, and preventing a product from achieving a too high speed due to a relatively large inclination angle. In case of transporting products which have a large variety of product properties such as weight, shape, size, flexibility and outer surface conditions, it is difficult to find an appropriate compromise.

SUMMARY

A helical conveyor prevents products from achieving undesired high speeds without the risk of getting stuck within the helical track for products having a great variety of product properties.

The helical conveyor has at least a portion of a bottom being formed by a transport surface of a drivable conveying system such that the transport surface has a predefined speed in downward direction along the helical track and the inclination angle at an inner bend of the transport surface of the conveying system is larger than 20°.

Due to the relatively large inclination angle at the inner bend of the transport surface of more than 20°, certain products, perhaps most of the products in a product range, will automatically slide or roll on the bottom in downward direction. Certain products, for example relatively heavy and large-sized products, may tend to stop moving with respect to the bottom under operating conditions, but these products will be forced to move downwardly by means of the transport surface of the drivable conveying system. Hence, the helical conveyor provides a combination of transporting products downwardly by means of gravity and by means of the transport surface of the drivable conveying system. A helical conveyor which has a bottom including a transport surface of a drivable conveying system as such is known in the prior art, for example a helical conveyor including an endless conveyor belt, but the bottom has a relatively small inclination angle, precisely in order to prevent products from moving downwardly with respect to the conveyor belt. Because of the helical track the inclination angle of the bottom decreases from the inner bend in radial outward direction with respect to the centerline. Therefore, a product which moves outwardly with respect to the bottom due to its high speed may decelerate automatically. It is noted that the helical conveyor herein is intended for transporting different discrete products, i.e. non-bulk material, such as articles in an e-commerce warehouse. The centerline may extend vertical and the helical track may have a plurality of windings.

In order to facilitate products to move in the downward direction by means of gravity, an upper side of the bottom is preferably smooth and free from obstacles in downward direction.

The inclination angle at the inner bend may be larger than 25° and even larger than 30°.

In a particular embodiment, the drivable conveying system comprises a drivable endless conveyor belt which is guided by the frame, wherein the conveyor belt has a transport section and a return section and wherein the transport surface is formed by an upper surface of the transport section. If a product tends to stick on the transport surface without further sliding or rolling downwardly by gravity the transport surface will take the product downwardly.

The return section may extend below the transport section such that it also follows a helical path. In this case the conveyor belt is reversed at an upper end and a lower end of the transport section, respectively. This embodiment is particularly advantageous in case of a limited number of helical windings since this configuration of the return section requires a relatively long conveyor belt which is more expensive and requires more driving power. However, because of the relatively large inclination angle of the transport surface the helical conveyor may have a limited number of windings, for example only a single winding.

In a practical embodiment, the conveyor belt is provided with elongate slats which are moveable with respect to each other and which have a longitudinal direction that extends perpendicular to the direction along the helical track. The slats may be mounted to an endless member, such as a chain, which is driven along the helical track.

Preferably, at the transport surface each slat overlaps an upper side of a neighbouring slat which is located downstream thereof, since this minimizes the risk that products get stuck behind a slat or between neighbouring slats.

The predefined transport speed may be less than 30 meter/min, preferably less than 20 meter/min and more preferably less than 10 meter/min. In practice, the transport speed may be relatively low when most products are transported by means of gravity.

In a preferred embodiment the transport surface of the conveying system is inclined downwardly in a direction from an outer bend thereof to its inner bend. This inclination is called banking. An advantage of this embodiment is that when a product moves at a relatively high speed downwardly with respect to the transport surface it will be forced in outward direction due to its speed, but since the inclination angle in the direction along the helical track decreases in outward direction the product may decelerate and move back inwardly, hence creating a self-stabilizing effect. Besides, in case of applying a conveyor belt including elongate slats as described hereinbefore it appears that banking minimizes a step effect in height direction between neighbouring slats which step effect may occur due to twist of the transport surface within the helical track in case of a relatively large inclination angle in a direction along the helical track.

In a particular embodiment a portion of the bottom is formed by the transport surface of the conveying system and the bottom is also provided with a static inner bend section which is fixed to the frame, wherein the static inner bend section extends along the transport surface of the conveying system and is adjacent to the inner bend thereof. The location of the static inner bend section results in a relatively large inclination in the direction along the helical track. Hence, when a product arrives on the static inner bend section it will almost certainly slide or roll downwardly by gravity. If a product accelerates on the static inner bend section it may move outwardly with respect to the bottom and decelerate automatically as described hereinbefore. In case of banking the transport surface a self-stabilizing effect may be enhanced.

The static inner bend section may have an upper surface which extends substantially horizontally as seen in a plane which extends radially from the centerline. The static inner bend section may be a plate.

The friction coefficient of the bottom where the transport surface of the conveying system is located may increase in radial outward direction from the centerline. An advantage of this embodiment is that a heavy product having a bottom including a low friction coefficient and moving downwardly with respect to the bottom of the helical track at a relatively high speed when its distance from the centerline is relatively small may move away from the centerline due to a centrifugal force on the product. Consequently, the product may decelerate due to the smaller inclination angle in the direction along the helical track and due to the increased friction coefficient. Hence, the speed of the heavy product can be limited automatically. On the other hand, a lightweight product having a bottom including a high friction coefficient and moving downwardly with respect to the transport surface of the drivable conveying system may decelerate due to its high friction coefficient, but the transport surface will move the product downwardly in that case.

If the bottom is provided with the static inner bend section the friction coefficient of the transport surface may be higher than the friction coefficient of the static inner bend section. In that case the friction coefficient of the static inner bend section may be substantially constant, whereas the coefficient of the transport surface may increase gradually in radial outward direction from the centerline, for example.

It is noted that the increasing friction coefficient in radial outward direction from the centerline is also conceivable in a helical conveyor without a transport surface of a drivable conveying system. In other words, an aspect of the invention is a helical conveyor for transporting products in downward direction by means of gravity, comprising a frame and a helical track extending around an upright centerline, which helical track is supported by the frame and comprises a bottom for bearing a product, wherein the friction coefficient of the bottom where the transport surface of the conveying system is located increases in radial outward direction from the centerline. The bottom may have an inclination angle in a direction along the helical track which is larger than 20° at an inner bend of the bottom.

The invention is also related to a method of transporting products by using the helical conveyor as described hereinbefore, wherein a first product and a second product are moved downwardly along the helical track, wherein the first product is moved by means of gravity at a higher speed than the predefined speed of the transport surface of the conveying system and the second product is moved by means of the transport surface of the conveying system at the predefined speed of the transport surface of the conveying system so as to transport the second product downwardly in case it remains on the transport surface.

The predefined speed may be less than 30 meter/min, preferably less than 20 meter/min and more preferably less than 10 meter/min.

The transport surface may move in downward direction only since the helical conveyor is not intended for transporting products upwardly.

The inclination angle at the inner bend of the transport surface of the conveying system may be selected such that more than 50% of the products that are transported slide and/or roll downwardly on the bottom. These products are transported by gravity rather than by the moving transport surface.

Each of these products may achieve a stabilized speed during moving downwardly, which means that during moving the acceleration or deceleration becomes or approaches zero such that the products have an acceptable speed when leaving the helical track. Such a situation can be achieved, for example, by banking the transport surface.

BRIEF DESCRIPTION OF THE DRAWINGS

Aspects of the invention will hereafter be elucidated with reference to very schematic drawings showing an embodiment of the invention by way of example.

DETAILED DESCRIPTION

Figure 1:
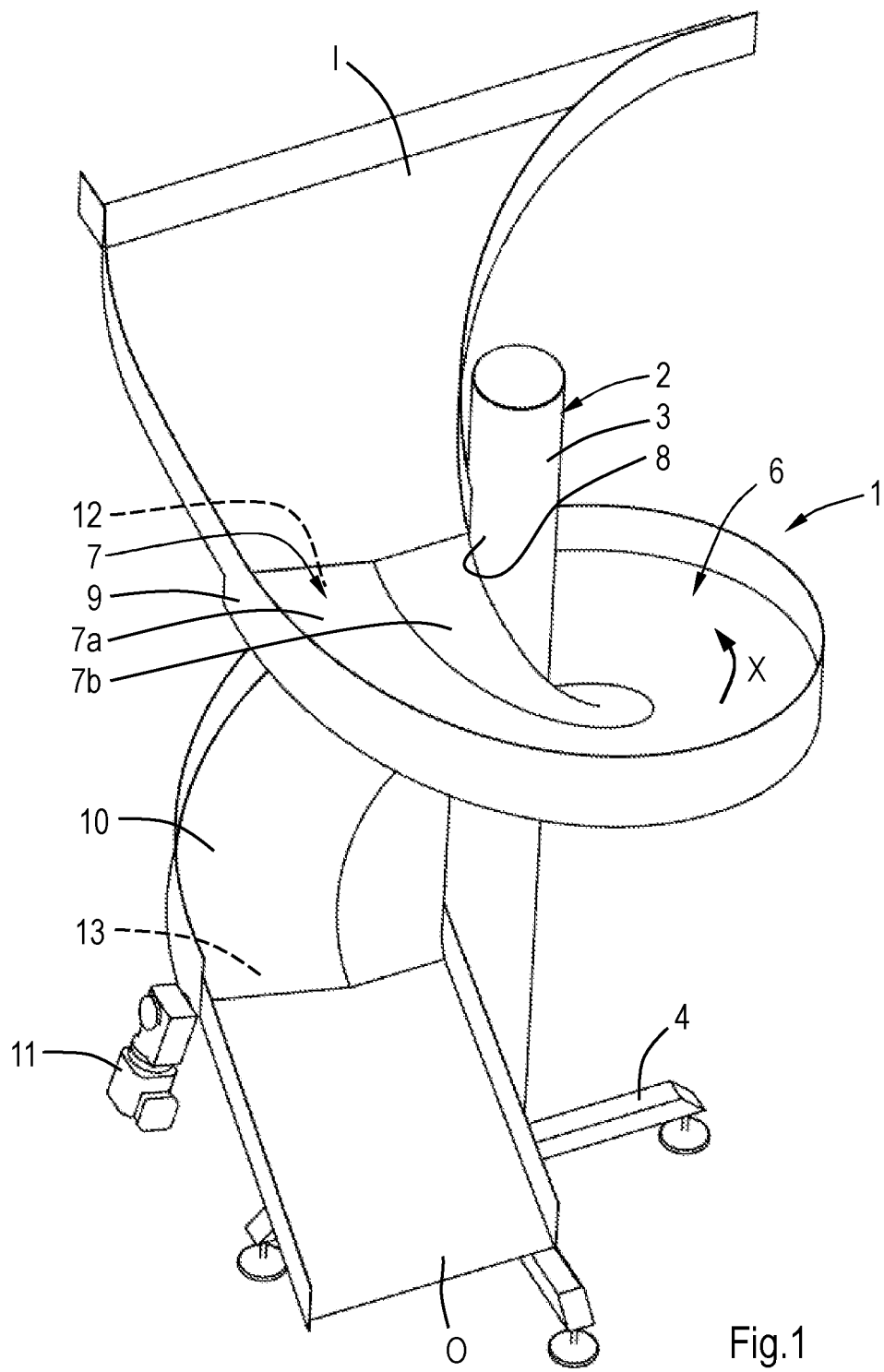
FIG. 1 is a perspective view of an embodiment of a helical conveyor.
Figure 2:
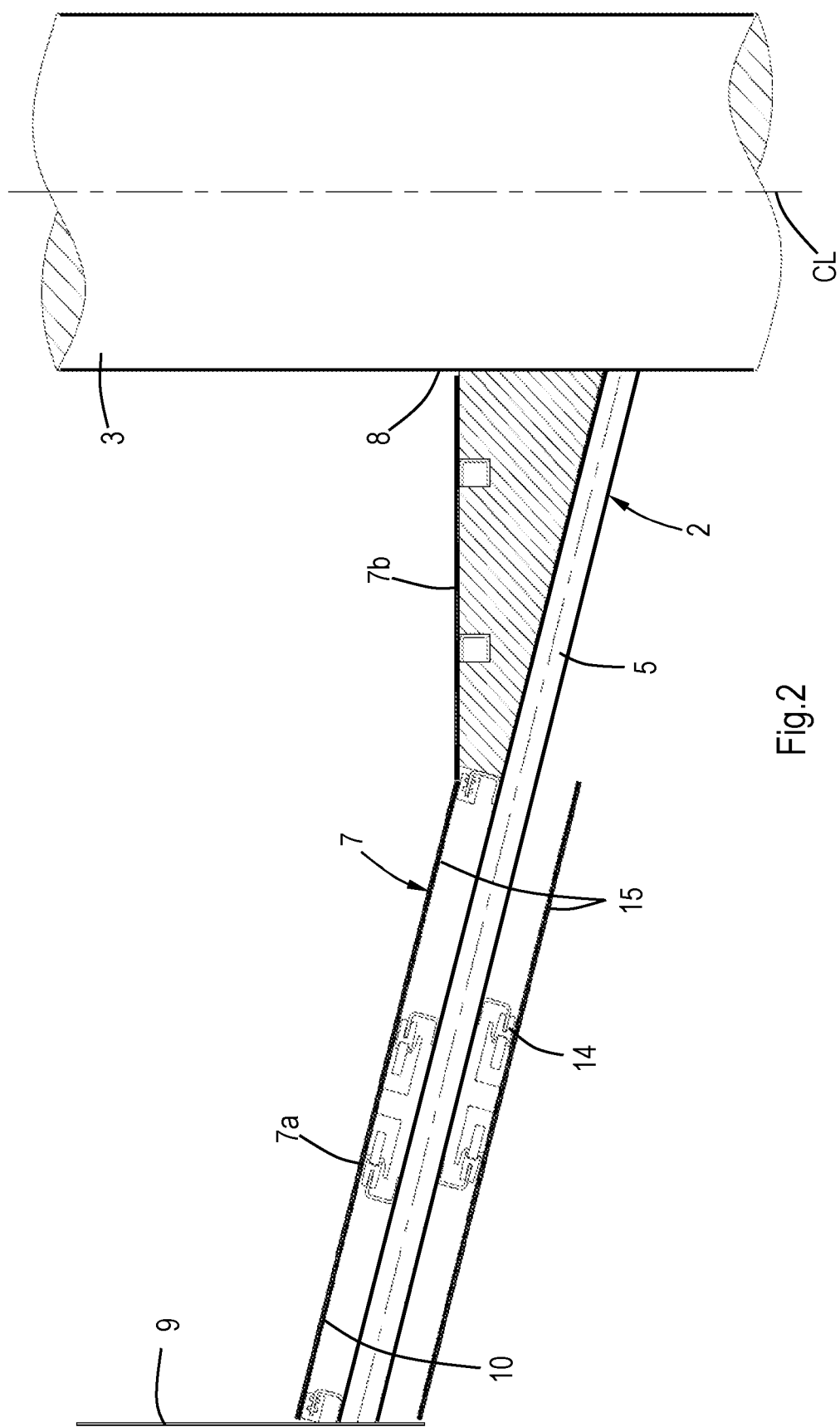
FIG. 2 is an enlarged cross-sectional view of a part of the helical conveyor according to FIG. 1.

FIGS. 1 and 2 show an embodiment of a helical conveyor 1 which is suitable for transporting products along a helical path in downward direction. The helical conveyor 1 can be used for transporting piece goods in an e-commerce warehouse, for example. At an upper side of the helical conveyor 1 is an input I and at a lower side of the helical conveyor 1 is an output O. Products may be supplied to the input I, for example from a sorting conveyor (not shown) at an elevated height level and transported downwardly via the input I, the helical conveyor 1 and the output O to a lower height level towards a downstream discharge conveyor, a collecting container or the like (not shown).

The helical conveyor 1 comprises a frame 2, in this case including a vertical cylindrical column 3 having feet 4 and radial bars 5 which support a helical track 6 extending around a vertical centerline CL of the column 3. The helical track 6 includes a bottom 7 for bearing a product, an inner side wall 8 extending along an inner bend of the bottom 7 and an outer side wall 9 extending along an outer bend of the bottom 7. The inner and outer side walls 8, 9 are fixed to the frame 2. In this case the inner side wall 8 along the inner bend of the bottom 7 is formed by an outer surface of the column 3, but a separate inner side wall at a distance from the column 3 is also conceivable. The number of windings of the helical conveyor 1 equals approximately one in this case, but this may be different in an alternative embodiment.

The input I is formed by a twisted plate which is fixed to the frame 2 and the output O is also formed by a plate which is fixed to the frame 2. It is not likely that in practice a product stops on the plate of the output O, but if this occurs it is easily accessible by an operator because of its location at a low height level.

A portion of the bottom 7 of the helical track 6 is formed by a transport surface 7a of a drivable conveying system in the form of a drivable endless conveyor belt 10. The conveyor belt 10 is guided by a belt support of the frame 2 and driveable by an electric motor 11 with respect to the frame 2 such that under operating conditions the transport surface 7a has a predefined speed in downward direction X along the helical track 6. The conveyor belt 10 has a transport section and a return section. The transport surface 7a is formed by an upper surface of the transport section.

The transport section of the conveyor belt 10 has an outer bend which is adjacent to the outer side wall 9 and an inner bend which is opposite to the outer bend. Because of the helical shape the transport surface 7a has an inclination angle in the direction X along the helical track 6 which inclination angle increases in a direction from its outer bend to its inner bend. Hence, the largest inclination angle is located at the inner bend of the transport section, in this case larger than 20°. This is a rather steep angle which, in practice, causes a lot of products to automatically slide or roll on the transport surface 7a in downward direction X along the helical track 6.

The belt support is provided with an upper pulley 12 which is located at un upper end of the helical track 6 and a lower pulley 13 which is located at a lower end of the helical track 6. The transport section of the conveyor belt 10 extends along the helical track 6 from the upper pulley 12 to the lower pulley 13. The return section of the conveyor belt 10 that does not contribute to the transport surface 7a is guided below the transport section through a return belt support 14 and extends from the lower pulley 13 to the upper pulley 12. The return section follows a helical path, as well, but in an upside down orientation.

In an alternative embodiment (not shown) the return section may be guided back via a non-helical path. Generally, the latter configuration has an advantage in terms of efficiency since the length of the conveyor belt can be shorter which causes less friction than when both the transport section and the return section follow helical paths, but in this case the inclination angle in the direction X along the helical track 6 is relatively steep such that only a limited number of windings are required. This means that the length of the endless conveyor belt 10 is relatively short. Consequently, it is advantageous that the return section extends below the transport section.

In the embodiment as shown in FIG. 1 the conveyor belt 10 is provided with elongate slats 15 which are moveable with respect to each other and which have a longitudinal direction that extends perpendicular to the direction X along the helical track 6. The slats 15 are coupled to each other through an endless connecting member, such as a chain (not shown). Within the transport section of the conveyor belt 10 each slat 15 may overlap an upper side of a neighbouring slat 15 which is located downstream thereof. This minimizes the risk of products getting stuck between neighbouring slats 15. Preferably, the upper surfaces of the slats 15 as well as upper surfaces of the input I and output O are smooth in order to create appropriate sliding characteristics.

FIGS. 1 and 2 show that the transport surface 7a of the conveyor belt 10 is inclined downwardly in a direction from its outer bend to its inner bend. This orientation is called banking and creates a balancing effect of products which move downwardly at a higher speed than the speed of the transport surface 7a. Because of its elevated speed such product tends to move outwardly towards the outer bend of the transport surface 7a. Since the inclination angle in the direction X along the helical track 6 decreases in the outward direction the product tends to decelerate and moves back in a direction from the outer bend to the inner bend of the transport surface 7a. Due to banking a return force on the product towards the inner bend is enhanced. The angle of banking may be 15°, for example. The inclination angle and/or the angle of banking may be selected such that in practice most of the products which slide or roll on the bottom 7 achieve a stabilized speed during moving downwardly on the bottom 7, i.e. their accelerations or decelerations will become or approach zero before arriving at the output O.

In the embodiment as shown in FIGS. 1 and 2 the bottom 7 is also provided with a static inner bend section 7b which is fixed to the frame 2. The static inner bend section 7b extends along the transport surface 7a and is adjacent to the inner bend thereof. The static inner bend section 7b is also adjacent to the column 3 such that the column 3 forms the inner side wall 8 at the inner bend of the bottom 7 as described hereinbefore. In this case, the static inner bend section 7b is plate-shaped and has a smooth upper surface. Because of the location of the static inner bend section 7b its inclination angle in the direction X along the helical track 6 is steeper than the inclination angle at the transport surface 7a. For example, the inclination angle in the direction X along the helical track 6 at the inner bend of the bottom 7, the inner bend of the transport surface 7a and the outer bend of the transport surface 7a may be 55°, 25° and 15°, respectively. FIG. 2 shows that the static inner bend section 7b has an upper surface which extends horizontal as seen in a radial plane extending from the centerline CL of the column 3.

Preferably, the plates of the input I and the output O are shaped such that their upper surfaces fit to the angled upper surfaces of the bottom 7 at the upper roller 12 and the lower roller 13.

Under operating conditions the conveyor belt 10 may be driven at a relatively low speed, for example less than 10 meter/min. In practice a part of a series of products, and preferably most of them, that are supplied to the transport surface 7a via the inlet I may slide or roll on the conveyor belt 10 in downward direction by means of gravity due to the relatively steep inclination of the helical track 6 and have a higher speed than the speed of the conveyor belt 10. A product which stays on the conveyor belt 10 and is transported by the conveyor belt 10 in downward direction arrives at the output O and has a speed which equals the speed of the transport surface 7a; in practice such a product will be transported by means of gravity further downwardly. If not, an operator may take the product from the output O. Therefore, it may be advantageous when a lower end of the transport surface 7a, in this case at the lower pulley 13 of the conveyor belt 10, is located below 2 meter or even below 1.5 meter above ground level.

In more general terms, in a method of transporting products by using the helical conveyor 1 a first product and a second product are moved downwardly along the helical track 6, whereas the first product is moved by means of gravity at a higher speed than the predefined speed of the transport surface 7a and the second product is moved by means of the conveyor belt 10 at the speed of the transport surface 7a so as to transport the second product downwardly in case it remains on the transport surface 7a.

The invention is not limited to the embodiment shown in the drawings and described hereinbefore, which may be varied in different manners within the scope of the claims and their technical equivalents. For example, instead of applying an endless conveyor belt the helical track may comprise alternative means for moving the transport surface in downward direction with respect to the frame, for example driveable rollers. Similarly, the input and/or the output may be provided with alternative guide means, for example freely rotating rollers or the like.

The invention claimed is:

1. A helical conveyor for transporting products in downward direction by means of gravity, comprising:
    a frame; and
    a helical track extending around an upright centerline, which helical track is supported by the frame and comprises a bottom for bearing a product, wherein the bottom has an inclination angle in a direction (X) along the helical track, wherein at least a portion of the bottom is formed by a transport surface of a drivable conveying system such that the transport surface has a predefined speed in the downward direction (X) along the helical track and an inclination angle at an inner bend of the transport surface of the drivable conveying system is larger than 20°, and wherein the transport surface of the conveying system is inclined downwardly in a direction from an outer bend thereof to the inner bend.

2. The helical conveyor according to claim 1, wherein the inclination angle at the inner bend is larger than 25°.

3. The helical conveyor according to claim 1, wherein the drivable conveying system comprises a drivable endless conveyor belt which is guided by the frame, wherein the conveyor belt has a transport section and a return section, wherein the transport surface is formed by an upper surface of the transport section.

4. The helical conveyor according to claim 3, wherein the return section extends below the transport section such that the return section also follows a helical path.

5. The helical conveyor according to claim 3, wherein the conveyor belt is provided with elongate slats which are moveable with respect to each other and which have a longitudinal direction that extends perpendicular to the direction (X) along the helical track.

6. The helical conveyor according to claim 5, wherein at the transport surface each slat overlaps an upper side of a neighboring slat which is located downstream thereof.

7. The helical conveyor according to claim 1, wherein the bottom is also provided with a static inner bend section which is fixed to the frame, wherein the static inner bend section extends along the transport surface of the conveying system and is adjacent to the inner bend thereof.

8. The helical conveyor according to claim 7, wherein the static inner bend section has an upper surface which extends substantially horizontally as seen in a plane which extends radially from the centerline.

9. The helical conveyor according to claim 1, wherein a friction coefficient of the bottom where the transport surface of the conveying system is located increases in a radial outward direction from the centerline.

10. The helical conveyor according to claim 9, wherein the bottom is also provided with a static inner bend section which is fixed to the frame, wherein the static inner bend section extends along the transport surface of the conveying system and is adjacent to the inner bend thereof, and wherein the friction coefficient of the transport surface is higher than the friction coefficient of the static inner bend section.

11. A method of transporting products by using a helical conveyor comprising a helical track extending around an upright centerline, wherein a bottom of the track has an inclination angle in a direction (X) along the helical track, wherein at least a portion of the bottom is formed by a transport surface of a drivable conveying system such that the transport surface has a predefined speed in a downward direction (X) along the helical track and an inclination angle at an inner bend of the transport surface of the drivable conveying system is larger than 20°, the method comprising:
    moving a first product downwardly along the helical track, wherein the first product is moved by means of gravity at a higher speed than the predefined speed of the transport surface of the conveying system; and
    moving a second product by the transport surface of the conveying system at the predefined speed of the transport surface of the conveying system so as to transport the second product downwardly in case the second product remains on the transport surface.

12. The method according to claim 11, wherein the predefined speed is less than 30 meter/min.

13. The method according to claim 12, wherein the predefined speed is less than 20 meters/min.

14. The method according to claim 13, wherein the predefined speed is less than 10 meters/min.

15. The method according to claim 11, wherein the transport surface moves in the downward direction (X) only.

16. The method according to claim 11, wherein the inclination angle at the inner bend of the transport surface of the conveying system is selected such that more than 50% of the products that are transported slide and/or roll downwardly on the bottom.

17. The method according to claim 16, wherein each of said products achieves a stabilized speed during moving downwardly on the bottom.

18. A helical conveyor for transporting products in downward direction by means of gravity, comprising:
    a frame; and
    a helical track extending around an upright centerline, which helical track is supported by the frame and comprises a bottom for bearing a product, wherein the bottom has an inclination angle in a direction (X) along the helical track, wherein at least a portion of the bottom is formed by a transport surface of a drivable conveying system such that the transport surface has a predefined speed in the downward direction (X) along the helical track that is less than 30 meters/min and an inclination angle at an inner bend of the transport surface of the drivable conveying system is larger than 20°.

19. The helical conveyor according to claim 18, wherein the transport surface of the conveying system is inclined downwardly in a direction from an outer bend thereof to the inner bend.

20. A helical conveyor for transporting products in downward direction by means of gravity, comprising:
    a frame; and
    a helical track extending around an upright centerline, which helical track is supported by the frame and comprises a bottom for bearing a product, wherein the bottom has an inclination angle in a direction (X) along the helical track, wherein at least a portion of the bottom is formed by a transport surface of a drivable conveying system such that the transport surface has a predefined speed in the downward direction (X) along the helical track and an inclination angle at an inner bend of the transport surface of the drivable conveying system is larger than 30°.

* * * * *